(No Model.) 2 Sheets—Sheet 1.

P. F. KRUG.
LATHE CHUCK.

No. 547,643. Patented Oct. 8, 1895.

Witnesses:
John Buckler,
George Krug

Inventor:
Philip F. Krug
By C. L. Horack
Attorney (No Model.) 2 Sheets—Sheet 2.
P. F. KRUG.
LATHE CHUCK.
No. 547,643. Patented Oct. 8, 1895.
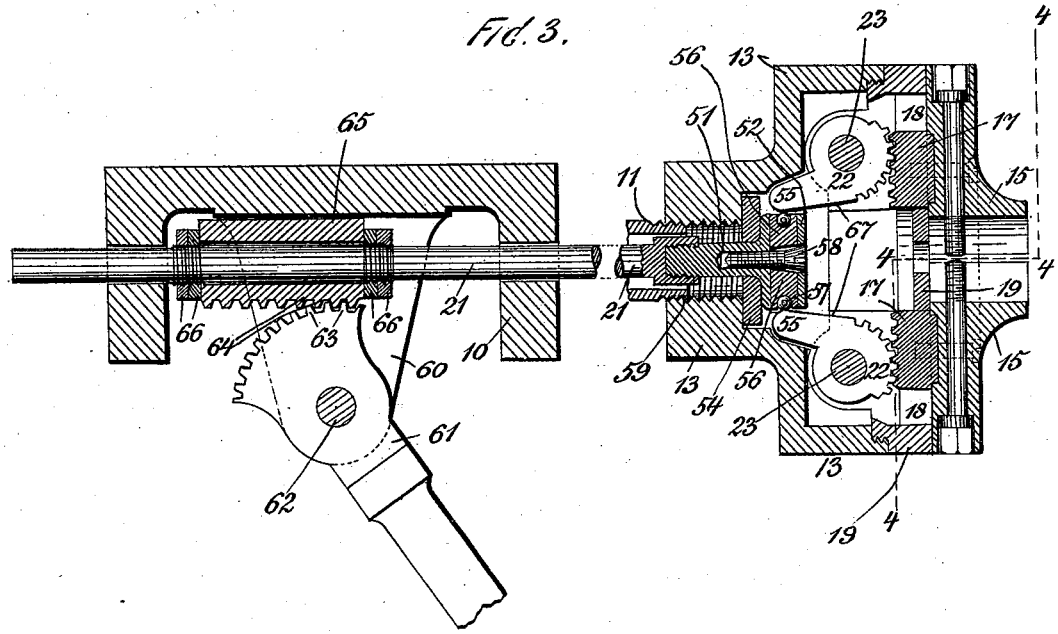
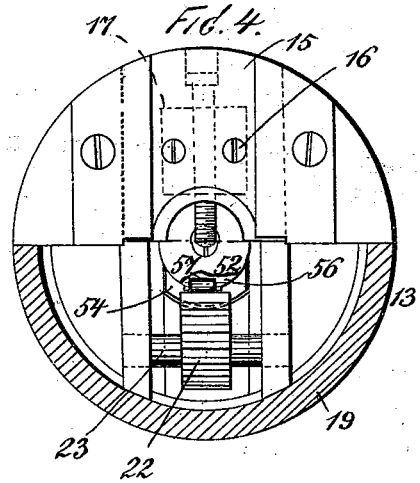
Witnesses:
John Buckler
George Krug
Inventor:
Philip F. Krug
C. L. Horack
Attorney.

UNITED STATES PATENT OFFICE.

PHILIP F. KRUG, OF NEW YORK, N. Y.

LATHE-CHUCK.

SPECIFICATION forming part of Letters Patent No. 547,643, dated October 8, 1895.

Application filed July 9, 1894. Serial No. 516,892. (No model.)

*To all whom it may concern:*

Be it known that I, PHILIP F. KRUG, a citizen of the United States, and a resident of the city of New York, county and State of New York, have invented certain new and useful Improvements in Lathe-Chucks, of which the following is a specification.

My invention refers to turning-lathes, and particularly to that part of the lathe termed the "chuck," and intended to firmly grip the article which is to be machined in the lathe and to cause such article to rotate while in contact with the tool which is to be employed in giving the desired shape to such article.

The purposes of my invention are to so construct a lathe and its chuck as to permit of opening and closing the latter while the lathe-spindle is revolving and without the use of wrenches or tools. Further purposes are to provide simple and efficient means for producing a strong, uniform, and prompt gripping action by the jaws of the chuck upon the article to be held and to be turned in the lathe. I accomplish these and other useful purposes in the manner and by the means hereinafter described, and set forth more particularly in the claims.

Figure 1:
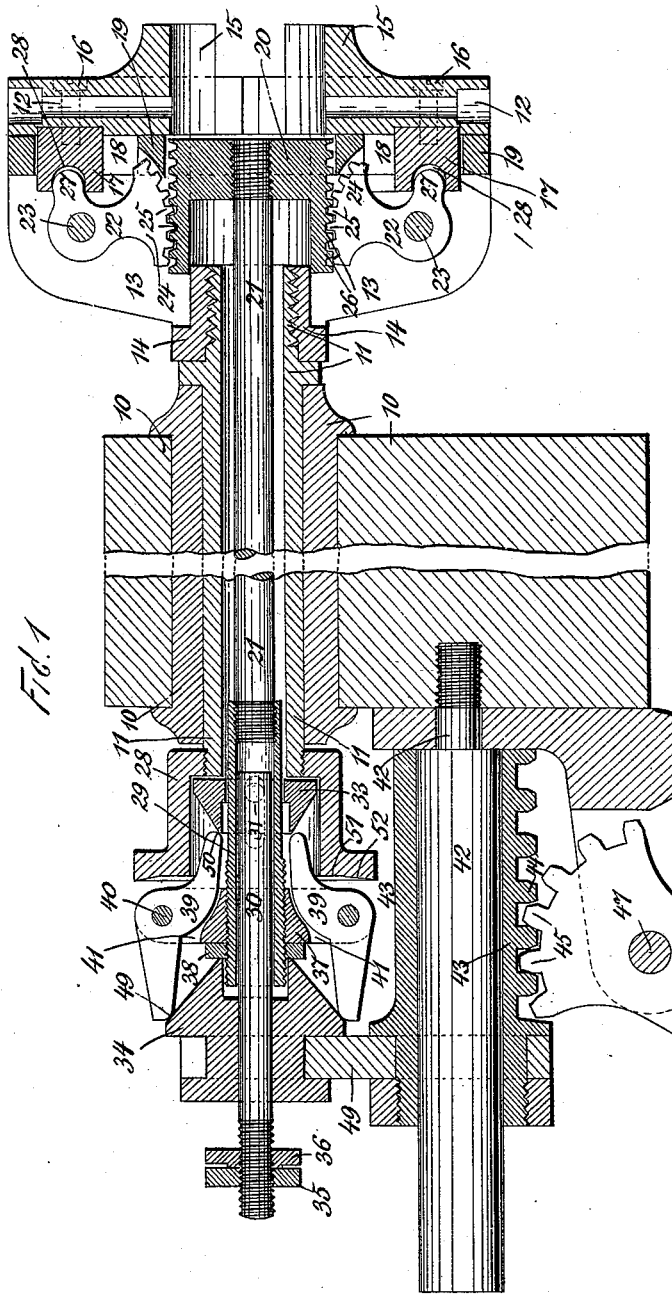
Figure 2:
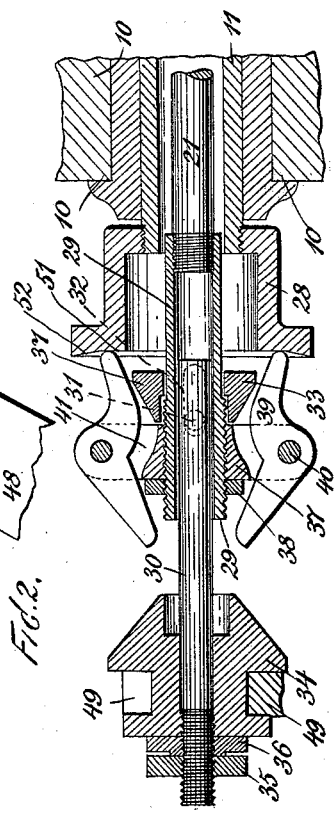

In the accompanying drawings, which form part of this specification, and wherein like figures of reference indicate corresponding parts, Figure 1 represents a longitudinal vertical section of a chuck and of part of the frame of the lathe to which such chuck is attached and carrying at the lathe-head the closing or locking mechanism for the chuck, the part of the lathe-frame carrying the closing mechanism being shown broken off from the part adjoining the chuck, as the intermediate part which would contain the part of the driving-spindle carrying the conical driving-pulley bears no special relation to my invention. In this view the chuck is shown open, and the locking mechanism is in a corresponding position. Fig. 2 shows a vertical longitudinal section of part of the locking mechanism illustrated in the left-hand part of Fig. 1, the members of such mechanism, however, corresponding in their relative positions with the closed condition of the chuck. Fig. 3 shows a sectional view, analogous to that illustrated in Fig. 1, of another device embodying the leading features of my invention, the chuck in this case, however, appearing closed; and Fig. 4 in its upper half an end view and in its lower half a section according to line 4 4 in Fig. 3.

10 represents parts of the lathe-frame in the vicinity of the hollow driving-spindle 11.

13 is the body of the chuck into which such spindle extends, it being attached to the same by screw-threads provided at the socket-shaped part 14.

15 15 are the jaws of the chuck adjusted in the usual manner to slide in proper guides and in radial directions along its front face. Said jaws contain channels 12 for receiving bolts, by means of which special dies may be attached to their inner edges. Said jaws are connected by screws 16 to blocks 17, adjusted to slide in proper guiding-slots 18, provided in the end flange 19 of the chuck-body.

20 is a cup-shaped device adjusted so as to have its inner surfaces, which preferably are flattened, to fit snugly over and slide along the outer surface of the shank of sleeve 14.

21 is a rod extending within the body of revolving spindle 11 and beyond its end and beyond the lathe-head. Said rod is secured by screw-thread to the central part of cup 20.

22 22 are pivoted levers secured by pivots 23 to the chuck-body, and so arranged as to simultaneously engage with the outer walls of cup 20 and with the rear parts of sliding blocks 17. For such purpose the lugs 24, forming parts of such pivoted levers, are provided with teeth 25, engaging with corresponding teeth 26 on the exterior surface of such cup-piece 20, while lugs 27 also forming parts of said pivoted levers, and made of rounding outlines, enter suitable depressions 128 in sliding-blocks 17 in such a manner that in case rod 21 and with it cup-piece 20 be moved to the left, the toothed parts of the pivoted levers will thereby be swung to the left, and in consequence lugs 27 will be swung inwardly toward the axis of the chuck and will carry with them sliding blocks 17 and jaws 15, thus producing a closing action of the latter. On the other hand it will be seen that in case the chuck be in a closed condition a movement to the right of rod 21 will produce movements in opposite directions of the parts specified, and consequently opening of the chuck. These movements of rod 21 and the securing of it in its locked position are brought about by the use of the mechanism hereinafter described.

The revolving spindle 11 has firmly secured to it at the point where it projects beyond the lathe-head a flanged socket 28, while to the end of rod 21 there is attached a coupling 29, a rod 30 within such coupling and screw-threaded at its outer end being slidingly joined to said coupling by a pin 31, extending through such rod and through suitable slots 32 provided in said coupling-piece.

33 and 34 are conical disks. The former is mounted on the smooth outer surface of coupling 29, so as to be capable of sliding along the same and within socket 28, and is firmly secured to inner end of rod 30 by pin 31 extending into its body. Disk 34 is mounted on the free end of rod 30 and is capable of sliding along the same.

35 and 36 are counter-nuts attached to the outer screw-threaded part of rod 30 for the purpose of limiting the outward movement of cone 34 at will. Between said two cones a block 37 is attached to the screw-threaded part of the outer surface of coupling 29, and confined in position by a counter-nut 38.

39 39 are two bell-crank levers fulcrumed at 40 to lugs 41 41 on block 37, and having proper rounding bearing-surfaces provided at their ends, capable of engaging with and sliding along the sloping surfaces of cones 33 and 34, as they are brought in contact therewith.

42 is a bar firmly screwed underneath shaft 21 to the part of the lathe-frame carrying the lathe-head. On said rod is mounted a sleeve 43, on the under side of which teeth 44 are provided, engaging with corresponding teeth 45 on the upper end of a lever 46, which is fulcrumed to the same casting to which bar 42 is attached. Said lever is provided with lower handle portion 48.

49 is a fork so embracing recessed parts of sleeve 43 and of cone 34 as to compel the same to move simultaneously to the right or left as sleeve 43 is so moved along rod 42 by the instrumentality of lever 46.

In Fig. 1, showing the relative positions of the parts of the apparatus when the chuck is open, the cone 34 is shown to have been moved to its extreme inward position and having thus established contact with and forced outward ends 49 49 of levers 39, and having also forced inward ends 50 50 of such levers, and by their sliding contact with the sloping surfaces of cone 33 having forced the latter into and to the bottom of socket-sleeve 28. When it is proposed to close the chuck the parts are brought into the positions shown in Fig. 2 by the movement to the left of rod 30 through the instrumentality of lever 46. Cone 33 will thereby be first moved toward the left-hand end of slot 32, swinging outward the ends 50 of lever 39, so as to bring the same even with the vertical parts 51 of the end surface of socket-sleeves 28 and make the same bind thereon, thus locking the chuck. By still further moving such cone up to the immediate vicinity of the end of slot 32 ends 50 may be forced outward by it still farther until they come in binding contact with the sloping parts 52 of said end surface. This provision is made so as to provide for slight variations in the diameters of the articles to be successively machined in the lathe. Thus the ends 50 of the levers 39 are firmly locked together with socket-sleeve 28, so as to compel the simultaneous revolving motion of all the parts which are rigidly connected with either of them, and will at the same time, through the instrumentality of rod 21, hold the jaws of the chuck against the article to be machined, so as to firmly grip the same thereby. Cone 34 is free to revolve within fork 49. Hence sleeve 43 and lever 46 cannot be affected by the locking action of levers 39 upon the end surface of socket 28. By properly adjusting the position of locking-lever block 37 on coupling 29 I can grip in the chuck articles or special dies of varying diameters.

In Figs. 3 and 4 the jaws 15 are again attached by means of screws 16 to blocks 17, sliding in guide-slots 18, provided in end face 19 of the chuck-body 13. However, in this case the levers 22, pivoted to the chuck-body at 23, engage with said sliding blocks by teeth meshing with teeth on the rear surfaces of blocks 17.

51 is a head connected by screw-thread with the interior of the cup-shaped inner end of longitudinal rod 21.

54 is a washer resting against this enlarged end of rod 21, so as to be free to move with the same and also along head 51. The front face of such washer is adapted to engage with the projections 55, extending inwardly on pivoted levers 22.

56 are cheeks placed within head 51, capable of slight outward movement, confined in position by means of a washer 52 and provided on their outer surfaces with friction-rollers 57.

58 is a set-screw having part of its shank made tapering, whereby said cheeks may be forced outward so as to secure operative contact between the friction-rollers and those surfaces on cam-pieces 22 with which they are to engage. Spindle 11, for revolving the chuck, is attached to the latter by screw-thread at 59. Such spindle surrounds rod 21.

60 are lugs attached to the lathe-frame near the lathe-head, and 61 a lever pivoted to said lugs at 62. Teeth 63 on said lever engage with teeth 64, provided on a sleeve 65, which sleeve is held in its desired position on rod 21 by lock-nuts 66. While rod 21 is adjusted to revolve, sleeve 64 is made to only slide longitudinally, its upper surface for such purpose being flattened and placed in contact with the lathe-frame. The chuck having been closed will remain so, owing to the binding action between friction-rollers 57 and the parts 67 of the surfaces of pivoted levers 22, with which they engage, until the handle of lever 61 is thrown to the left, when rod 21, and with it head 51 and cheeks 56, will be moved toward the right, and the jaws of the chuck will thus be permitted to open. If, however, for any reason levers 22 should fail to swing, so as to move jaws 15 outward from their locking positions, the enlarged inner end of rod 21, coming then in contact with washer 54, will push the same to the right, cause it to engage with ends 55 of the levers, and, moving the same forward, will positively compel the opening of the chuck.

While in the drawings the chucks are shown to be provided with only two jaws each, it will readily be seen that a greater number of jaws may be used instead, if desired.

Having claimed in another application bearing even date herewith certain features illustrated and described, but not claimed herein, I hereby disclaim, as far as this application is concerned, what is so claimed elsewhere by me.

I claim as new and desire to secure by Letters Patent—

1. In a lathe, in combination with its frame, a chuck provided with movable jaws, a lengthwise movable rod adjusted to actuate the jaws, a hollow spindle through which such rod extends, levers mounted on a fulcrum block adjustably connected with said rod by screw-thread, a sleeve, as 28, mounted on the spindle and carrying wedging surfaces adapted to engage with proper bearing surfaces on the levers, substantially as set forth.

2. In a lathe, in combination with its frame, a chuck provided with movable jaws, a hollow lathe spindle, a movable rod extending within such spindle, levers mounted on a fulcrum block adjustably connected with said rod by screw-thread, a sleeve, as 28, mounted on the spindle and carrying wedging surfaces adapted to engage with proper bearing surfaces on the levers, and an adjustable cone for regulating the movement of the levers, substantially as set forth.

3. In a lathe, in combination with its frame, a chuck provided with movable jaws, a hollow lathe spindle, a movable rod extending within such spindle, levers adjustably mounted on said rod, a sleeve, as 28, mounted on the spindle and carrying wedging surfaces adapted to engage with the levers, an adjustable cone for regulating the movement of the levers, and a slide, as 43, adjusted to move parallel with the axis of such cone, and a fork connecting said slide and said cone, substantially as set forth.

4. In a lathe, in combination with its frame, a chuck provided with movable jaws, a revolving lathe spindle, a movable rod extending along such spindle, levers adjustably mounted on said rod, a sleeve, as 28, mounted on the spindle and provided with wedging surfaces adapted to engage with the levers, an adjustable cone for regulating the movement of the levers, a slide connected with such a cone, and a lever for actuating the slide, substantially as set forth.

5. In a lathe, in combination with its frame, a chuck provided with movable jaws, a hollow lathe spindle, a movable rod extending within such spindle, levers mounted on said rod, a sleeve, as 28, mounted on the spindle and carrying wedging surfaces adapted to engage with proper bearing surfaces on the levers, and two adjustable cones adapted to engage with opposite arms of the levers for regulating their movement, substantially as set forth.

6. In a lathe, in combination with its frame revolving spindle 11, rod 21 provided with toothed head 20, toothed pivoted levers 22 in engagement therewith, sliding blocks 17 actuated by said cams, and means for locking together rod 21 and spindle 11, substantially as set forth.

In testimony that I claim the foregoing as my invention I have signed my name, in presence of two witnesses, this 3d day of July, 1894.

PHILIP F. KRUG.

Witnesses:
CHAS. L. HORACK,
JOHN C. GULICK.